United States Patent [19]

Lee et al.

[11] Patent Number: 4,731,655

[45] Date of Patent: Mar. 15, 1988

[54] PROTECTION CIRCUIT FOR IMPROPER LINE VOLTAGE

[75] Inventors: Wayne Lee, Taipei; Shin T. Tzuo, Taoyuan, both of Taiwan

[73] Assignee: RCA Corporation, Princeton, N.J.

[21] Appl. No.: 900,867

[22] Filed: Aug. 27, 1986

[51] Int. Cl.⁴ .............................................. H04N 5/63
[52] U.S. Cl. ..................... 358/190; 358/243; 358/74; 363/50
[58] Field of Search ............... 358/190, 243, 74; 363/50, 13

[56] References Cited

U.S. PATENT DOCUMENTS

| | | | |
|---|---|---|---|
| 3,725,739 | 4/1973 | Griffey | 358/243 X |
| 3,819,986 | 6/1974 | Fukuoka | 358/190 X |
| 3,878,326 | 4/1975 | Fitzgerald, Jr. | 178/7.3 |
| 3,908,159 | 9/1975 | Griffey | 358/190 X |
| 4,112,465 | 9/1978 | Willis | 358/190 |
| 4,115,814 | 9/1978 | Kosaka et al. | 358/243 |
| 4,234,829 | 11/1980 | Willis | 358/190 X |
| 4,318,037 | 3/1982 | Amaro | 358/190 X |
| 4,375,661 | 3/1983 | Savic | 358/190 X |
| 4,385,264 | 5/1983 | Balaban et al. | 315/411 |
| 4,387,324 | 6/1983 | Willis | 358/190 X |
| 4,641,064 | 2/1987 | Testin et al. | 358/243 X |
| 4,656,573 | 4/1987 | Lee | 358/190 X |
| 4,660,093 | 4/1987 | Craig et al. | 358/190 X |

OTHER PUBLICATIONS

Millman, "Micro-Electronics Digital and Analog Circuits and Systems", 1979, p. 680.
Grafham and Hey, "SCR Manual 5th Edition General Electric", 1972, pp. 209-210.

Primary Examiner—James J. Groody
Assistant Examiner—E. Anne Faris
Attorney, Agent, or Firm—Paul J. Rasmussen; Joseph J. Laks; Scott J. Stevens

[57] ABSTRACT

A video display apparatus includes a protection circuit for preventing damage due to the application of excessively high line voltage. The video display apparatus includes a start-up circuit that provides power to initiate operation of a switching voltage regulator. In response to an improperly high line voltage, the start-up circuit is disabled and the video display apparatus does not become operative.

4 Claims, 1 Drawing Figure

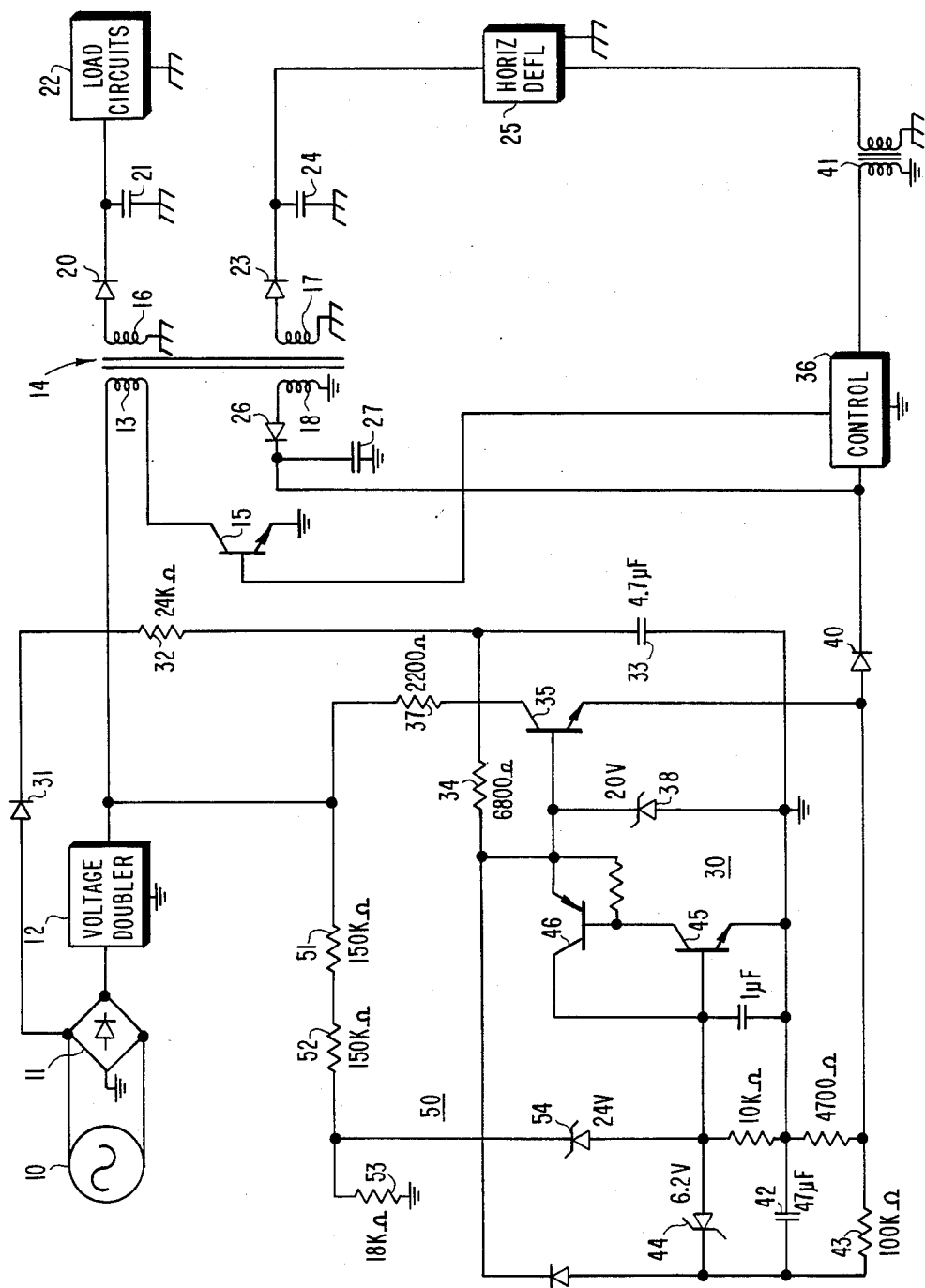

PROTECTION CIRCUIT FOR IMPROPER LINE VOLTAGE

This invention relates to video display apparatus and, in particular, to video display apparatus adapted to operate at a particular line voltage.

Video display apparatus, in particular computer monitors, are often designed to operate in many different locatons and environments, and with a variety of peripheral equipment. For example, one monitor may be able to be used with many different computers in different applications.

The video display apparatus, however, may be designed to operate at a particular line voltage, for example, 120 volts. Since damage to the monitor circuitry could result from improper operation at the wrong line voltage, 220 volts, for example, care must be taken to avoid improper line voltage operation. In the case of an error, however, it is desirable to provide integral protection circuitry to guard against damage due to the inadvertent application of the wrong line voltage.

In accordance with an aspect of the present invention, a video display apparatus comprises a source of unregulated voltage having a level representative of the level of an applied line voltage. A circuit is responsive to an operating voltage for rendering the video display apparatus operative. A start-up circuit is responsive to the unregulated voltage for producing the operating voltage. A protection circuit responds to the unregulated voltage and produces an output signal when the level of the unregulated voltage is above a predetermined level. The output signal disables the start-up circuit such that the video display apparatus is rendered inoperative.

In the accompanying drawing, the sole FIGURE is a block and schematic diagram of a portion of a video display appartus in accordance with an aspect of the present invention.

Referring to the FIGURE, a source of AC line voltage 10 is coupled to a bridge rectifier circuit 11. The rectified AC voltage is applied to a voltage doubler circuit 12 which produces the unregulated DC B+ voltage. This unregulated B+ voltage is applied to one terminal of a primary winding 13 of a power supply transformer 14. The other terminal of winding 13 is coupled to the conductor of a switching transistor 15. Conduction of transistor 15 causes current to flow in primary winding 13 which, by transformer action, causes voltages to be induced across secondary windings 16, 17, and 18. The voltage across winding 16 is rectified by diode 20 and filtered by capacitor 21 to provide a DC supply voltage that illustratively powers load circuits 22 of the video display apparatus. Load circuits 22 may comprise, for example, video processing, audio, and vertical deflection circuits.

The voltage across winding 17 is rectified and filtered by diode 23 and capacitor 24, respectively, to provide a DC operating voltage for horizontal deflection circuit 25. Horizontal deflection circuit 25 produces horizontal or line-rate deflection current in a deflection yoke winding (not shown) located on the neck of a cathode ray tube (also not shown) in order to deflect the electron beam or beams produced by the cathode ray tube.

The voltage developed across winding 18 is rectified by diode 26 and filtered by capacitor 27 to produce a DC supply voltage that is used in a manner to be described later. Transformer 14 also provides electrical isolation between the source of AC line voltage and any user accessible audio and video input and output terminals, for example, associated with load circuits 22.

In order for the video display apparatus to become operative, the voltage supplies associated with power transformer 14 must become established. This is accomplished by initializing the switching of switching transistor 15 by the action of a start-up circuit 30, which operates as follows.

The AC line voltage from AC line voltage source 10 is rectified by diode 31 and, via resistor 32, charges capacitor 33 to establish a DC voltage level which, via resistor 34, is sufficient to render transistor 35 conductive. Conduction of transistor 35 energizes control circuit 36 by applying power via the current path from the output of voltage doubler 12 through resistor 37, the collector emitter path of transistor 35 and diode 40. Control circuit 36 produces switching pulses for transistor 15 in order to establish the transformer secondary winding supply voltages previously described. The DC supply voltage developed from winding 18 provides the operating power for control circuit 36 under normal opeation after start-up occurs. Horizontal deflection circuit 25 provides a feedback signal to control circuit 36 via electrical isolation transformer 41 in order to control the rate and/or duration of the switching pulses produced by control circuit 36. By controlling the switching of transistor 15, the secondary supply voltage can therefore be regulated. Zener diode 38 limits the base voltage applied to transistor 35.

Conduction of transistor 35 also causes capacitor 42 to become charge via resistor 43. When the voltage across capacitor 42 reaches the breakdown voltage of zener diode 44, illustratively of the order of 6.2 volts, zener diode 44 will conduct current into the base of transistor 45, thereby rendering transistor 45 conductive. Conduction of transistor 45 causes transistor 46 to become conductive, thereby shunting base current away from transistor 35. This causes transistor 35 to turn off, thereby disabling the start-up circuit 30. The time constant determined by capacitor 42 and resistor 43, of the order of 3 seconds, is sufficient to allow the secondary voltage supplies to become established, and in particular, the voltage supply provided by winding 18, which supplies normal operating power to control circuit 36.

The video display apparatus of the FIGURE is illustratively adapted to operate at a nominal line voltage of the order of 120 VAC. In accordance with an aspect of the present invention, the video display apparatus of the FIGURE incorporates a protection circuit 50 that prevents damage from occurring to the video display apparatus in the event the video display apparatus is inadvertently connected to an improper AC line supply, for example, of the order of 220 VAC. Protection circuit 50 comprises resistors 51, 52 and 53, and zener diode 54, having its anode connected to the base of transistor 45. Resistors 51, 52 and 53 form a voltage divider which reduces the voltage level applied to zener diode 54. The breakdown voltage of zener diode 54 is selected such that for proper supply voltage levels, i.e., a nominal AC supply voltage of the order of 120 VAC, for example, the voltage applied to the cathode of zener diode 54 is insufficient to cause zener diode 54 to breakdown or avalanche. Start-up circuit 30 therefore operates in its normal manner. If an improperly high line voltage is inadvertently applied, of the order of 220 VAC, for example, the voltage applied to the cathode of zener diode 54 will be sufficient to cause zener diode 54 to breakdown. Zener diode 54 is illustratively selected to breakdown with an applied AC line voltage of the order of 160 VAC. When breakdown of zener diode 54 occurs, current is conducted into the base of transistor 45, rendering transistor 45 conductive. Transistor 46 is therefore rendered conductive, and transistor 35 is made nonconductive. Start-up circuit 30 is therefore disabled. The action of protection circuit 50 is very fast, and does not allow start-up circuit 30 to operate so that switching pulses are not producd by control circuit 36. The video display apparatus is therefore prevented from becoming operative by the action of protection circuit 50. By immediately disabling the start-up circuit, protection circuit 50 preents the video display apparatus from beginning operation, thereby preventing damage to any of the video display apparatus circuits due to improperly high line voltage.

What is claimed is:

1. A video display apparatus comprising:
   a source of unregulated voltage derived from and having a level representative of the level of an applied line voltage;
   means responsive to an operating voltage for rendering said video display apparatus operative;
   start-up means responsive to said unregulated voltage for producing said operating voltage; and
   protection means responsive to said unregulated voltage for producing an output signal when the level of said unregulated voltage is above a predetermined level, said output signal disabling said start-up means such that said video display apparatus is rendered inoperative.

2. A video display apparatus comprising:
   a source of unregulated voltage derived from and having a level representative of the level of an applied line voltage;
   means responsive to an operating voltage for rendering said video display apparatus operative;
   start-up means responsive to said unregulated voltage for producing said operating voltage; and
   protection means responsive to said unregulated voltage for protecting an output signal when the level of said unregulated voltage is above a predetermined level, said output signal disabling said start-up means such that said video display apparatus is rendered inoperative, wherein said start-up means comprises a transistor switch for producing said operating voltage when said transistor switch is rendered conductive.

3. A video display apparatus comprising:
   a source of unregulated voltage derived from and having a level representative of the level of an applied line voltage;
   means responsive to an operating voltage for rendering said video display apparatus operative;
   start-up means responsive to said unregulated voltage for producing said operating voltage; and
   protection means responsive to said unregulated voltage for producing an output signal when the level of said unregulated voltage is above a predetermined level, said output signal disabling said start-up means such that said video display apparatus is rendered inoperative, wherein said start-up means comprises a transistor switch for producing said operating voltage when said transistor switch is rendered conductive, and wherein said start-up means further comprises timing means for rendering said transistor switch nonconductive after a predetermined interval.

4. A video display apparatus comprising:
   a source of unregulated voltage derived from and having a level representative of the level of an applied line voltage;
   means responsive to an operating voltage for rendering said video display apparatus operative;
   start-up means responsive to said unregulated voltage for producing said operating voltage; and
   protection means responsive to said unregulated voltage for producing an output signal when the level of said unregulated voltage is above a predetermined level, said output signal disabling said start-up means such that said video display appartus is rendered inoperative, wherein said start-up means comprises a transistor switch for producing said operating voltage when said transistor switch is rendered conductive, and wherein said protection means is responsive to said unregulated voltage above said predetermine dlevel for rendering said transistor switch nonconductive.

* * * * *